UNITED STATES PATENT OFFICE.

WILLIAM R. WHITE, OF BIRMINGHAM, ALABAMA, ASSIGNOR OF ONE-HALF TO HUGH MARTIN AND JAMES A. MARTIN, BOTH OF BIRMINGHAM, ALABAMA.

PROCESS OF TREATING NUTS.

1,016,863.  Specification of Letters Patent.  Patented Feb. 6, 1912.

No Drawing.  Application filed March 18, 1911.  Serial No. 615,301.

*To all whom it may concern:*

Be it known that I, WILLIAM R. WHITE, a citizen of the United States, residing at Birmingham, in the county of Jefferson and State of Alabama, have invented new and useful Improvements in Processes for Treating Nuts, of which the following is a specification.

My invention relates to a process for treating peanuts and other nuts, its object being to produce a salty flavor in the nuts while in the shell.

A further object of my invention is to treat the shells containing the salted nuts after the latter have been roasted to better preserve and protect the nuts and increase their market value.

In treating peanuts according to my invention, I first provide a bath of brine or water highly impregnated with salt, and into this bath I deposit the unshelled peanuts that are to be treated. As many peanuts may be introduced into the bath as may be covered by the brine. I have found by experiments that where the brine is heated very hot the nuts become tough and discolored and their quality is impaired. I particularly desire to avoid this and, accordingly prefer that the bath should be cold or luke warm. The nuts are allowed to remain in this bath until the brine has soaked through the shells and filled the cavity therein surrounding the peanuts. According to the grade of the peanut and the thickness of its shell, the time required will vary from 5 to 15 days for this pickling process. When the shells have become thus filled with the brine the unshelled peanuts are ready to be removed from the bath of brine and are then preferably passed through a bath of fresh water to wash the deposit of salt from the shells of the peanuts. After this cleansing bath the peanuts are subjected to an evaporating process, which may be conducted by either exposing the same to the sun or to artificial heat. This evaporating process effectively dries out the liquid in the shells and leaves the peanut impregnated with salt so that they have a decided and agreeable salty flavor. After the nuts have been thus dried out they are roasted in any customary manner and while the shells are still highly heated, as for instance immediately after their discharge from the roaster, a coating solution is poured over the nuts and they are stirred so as to cause the solution to be spread over the shells. This solution is intended to coat the shells to make them water-proof and thereby preserve the quality and condition of the roasted peanuts in the shell. One coating solution which I have found effective and serviceable, as well as cheap, is derived from the solution of a pound of gelatin to a gallon of water. This gelatinous solution is sufficient to treat from five to ten bushels of peanuts, and the advantage of applying it when the peanuts are hot lies in the fact that the heat of the shells will rapidly evaporate the water in the gelatinous solution and dry and harden the film or coating which covers the shells and renders them more impervious.

While the pickling process requires some time for treatment of the nuts, yet by reason of the fact that this treatment can be carried on in bulk without any special or expensive apparatus, I find that I am able to produce roasted salted peanuts in the shell at a nominal expense.

My process can be carried on without the subsequent coating of the shell of the peanuts, if the latter are to be used for immediate consumption. Where however the nuts are to be shipped after being salted and roasted, the period of time during which the nut would retain its crisp roasted condition would be greatly increased by my improved coating process.

Having thus described my invention, what I claim as new and desire to secure by Letters Patent, is:—

The herein described process for producing salted nuts in the shell, which consists in pickling the unshelled nuts in a bath of brine, washing the shells to remove the salt thereon, drying and roasting the unshelled nuts, and moistening the shells of the nuts while heated with a solution of gelatin and water to coat the shells, substantially as described.

In testimony whereof I have hereunto set my hand in presence of two subscribing witnesses.

WILLIAM R. WHITE.

Witnesses:
R. D. JOHNSTON, Jr.,
FORNEY JOHNSTON.